United States Patent
Reichardt et al.

(10) Patent No.: US 11,713,369 B2
(45) Date of Patent: Aug. 1, 2023

(54) POLYMERIC ADDITIVES FOR REDUCING THE VISCOSITY LOSS ON TINTING

(71) Applicant: BASF SE, Ludwigshafen am Rhein (DE)

(72) Inventors: Robert Reichardt, Ludwigshafen (DE); Matthias Maier, Ludwigshafen (DE); Tim Meisenzahl, Ludwigshafen (DE)

(73) Assignee: BASF SE

( * ) Notice: Subject to any disclaimer, the term of this patent is extended or adjusted under 35 U.S.C. 154(b) by 302 days.

(21) Appl. No.: 16/761,947

(22) PCT Filed: Oct. 30, 2018

(86) PCT No.: PCT/EP2018/079625
§ 371 (c)(1),
(2) Date: May 6, 2020

(87) PCT Pub. No.: WO2019/091819
PCT Pub. Date: May 16, 2019

(65) Prior Publication Data
US 2020/0262965 A1    Aug. 20, 2020

(30) Foreign Application Priority Data
Nov. 8, 2017  (EP) ..................................... 17200686

(51) Int. Cl.
| | | |
|---|---|---|
| *C08G 18/48* | (2006.01) | |
| *C08G 18/28* | (2006.01) | |
| *C09D 175/08* | (2006.01) | |
| *C09D 7/43* | (2018.01) | |
| *C09D 7/20* | (2018.01) | |
| *C08L 75/08* | (2006.01) | |
| *C08G 18/20* | (2006.01) | |

(52) U.S. Cl.
CPC ..... *C08G 18/4833* (2013.01); *C08G 18/2063* (2013.01); *C08G 18/2825* (2013.01); *C09D 7/20* (2018.01); *C09D 7/43* (2018.01); *C09D 175/08* (2013.01); *C08L 75/08* (2013.01)

(58) Field of Classification Search
CPC .............................. C09D 7/43; C08G 18/2825
See application file for complete search history.

(56) References Cited

U.S. PATENT DOCUMENTS

| | | | |
|---|---|---|---|
| 5,137,571 A | | 8/1992 | Eisenhart et al. |
| 5,959,013 A | * | 9/1999 | Conradi ................... C08K 5/06 524/378 |
| 6,150,445 A | * | 11/2000 | Bostrom .................. C09D 7/43 524/378 |
| 2005/0150418 A1 | | 7/2005 | Bakeev et al. |
| 2007/0155880 A1 | | 7/2007 | Bobsein et al. |
| 2008/0108775 A1 | * | 5/2008 | Schieferstein ........... C09D 7/43 528/66 |
| 2009/0318595 A1 | | 12/2009 | Steinmetz et al. |
| 2011/0130471 A1 | * | 6/2011 | Munzenberg ...... C08G 18/2825 514/772.3 |

OTHER PUBLICATIONS 2-hexyl-1-decanol information. Toronto Research Chemicals. https://www.trc-canada.com/product-detail/?H295710. As viewed on Mar. 14, 2022. (Year: 2022).*
Extended European Search Report dated Apr. 18, 2018 in European Patent Application No. 17200686.8, 3 pages.
International Search Report dated Feb. 13, 2019 in PCT/EP2018/079625 filed on Oct. 30, 2018.

* cited by examiner

*Primary Examiner* — Stephen E Rieth
(74) *Attorney, Agent, or Firm* — Faegre Drinker Biddle & Reath LLP

(57) ABSTRACT

The presently claimed invention relates to a composition comprising polyurethane polymer and diluents, which is used as an additive in coating formulations, in particular water-borne paint and coating formulations, for reducing the effect of the viscosity loss caused by the addition of colorants/pigment pastes thereby improving the viscosity stability in tinted coating formulations as well as the method for preparing the composition.

20 Claims, No Drawings

POLYMERIC ADDITIVES FOR REDUCING THE VISCOSITY LOSS ON TINTING

The presently claimed invention relates to a composition comprising polyurethane polymers and diluents, which is used as an additive in coating formulations, in particular water-borne paint and coating formulations, for reducing the effect of the viscosity loss caused by the addition of colorants/pigment pastes thereby improving the viscosity stability in tinted paint and coating formulations.

BACKGROUND OF THE INVENTION

The growing need to reduce volatile organic component (VOC) emissions is slowly phasing out the use of organic solvents. Because of this trend, many formulators have replaced organic solvents with water as the liquid medium for binders, pigments and additives. These coatings are called water-borne coating formulations.

In water-borne coating formulations, the regulation of the flow behaviour by changing the molecular weight of the binder is not possible as the binder is present in the form of dispersed polymer particles. Rheological additives (thickeners) must therefore be used to adjust the flow properties of water-borne paint and coating formulations.

It is state of the art to use associative thickeners as rheology modifier additives in paints and coating formulations.

Hydrophobically modified ethylene oxide urethane (HEUR) polymer are associative thickeners comprised of ethylene oxide chains with hydrophobic end groups. They are non-ionic and water-soluble across pH levels. The solubility is due to the polymer's ethylene oxide backbone. The function of the hydrophobic groups is to associate with hydrophobic groups at the surface of binder latex particles, pigments and with hydrophobes from other rheology modifier polymers. Such associations result in the formation of a three-dimensional network structure that imparts viscosity to the coating formulation.

HEURs provide good flow and levelling, good shear stability and minimal impact on water sensitivity. However, HEURs are very sensitive to the paint's composition.

Colorants are a major factor limiting HEUR's usage in tint-base paints. Color base paints with HEURs are known to have viscosity instability after they are tinted, i.e., admixed with a color concentrate or colorant composition. Colorant compositions contain organic or inorganic pigments, solvents (which can include water), and surfactants used to stabilize the pigments in the colorants. The hydrophobes from these surfactants compete for adsorption sites on the latex surface thereby displacing some of the rheology modifier (associative thickeners) from that surface. The net effect of this competition is that there will be fewer rheology modifier hydrophobes adsorbed, resulting in a weaker network thereby significantly decreasing the viscosity in the paint formulations. The decrease in viscosity is related to surfactant and associative thickener interactions. The surfactants also influence the phase behavior and network formation of associative thickeners in aqueous solutions.

A problem that occurs in paints containing associative thickeners is a drop in low shear viscosity when colorants are added to the paint formulation.

Low-shear viscosity is the viscosity exhibited when the applied shear rate is in the range of 0.1 $s^{-1}$ to 400 $s^{-1}$. Low shear conditions are typically experienced by the paint while it is in the can and immediately after it has been applied to the wall. During these phases, sufficient low shear viscosity is needed to resist pigment settling and film sag but providing the required levelling of the applied paint film. Brookfield viscosity is a common measure of a paint's low-shear viscosity.

The state of the art provides the following technical solutions to mitigate the effects of colorant addition in water-borne paint and coating formulations. One such solution is to minimize the use of associative thickeners, and in their place use non-associative thickeners. This approach tends to result in poor flow as when a non-associative thickener is added, there is flocculation of the latex particles, resulting in regions of high latex concentration and regions of low concentration. This flocculation creates high viscosity at low shear rates, which leads to poor flow and levelling of the coating. A second approach to mitigating the viscosity loss problem is to over-thicken the untinted base paint, so that after tinting, the viscosity drops to the desired final viscosity. Generally, it is possible to formulate a light tint base at a high enough shear viscosity that colorants added to it will not depress the viscosity to an unacceptable degree. In some instances, combinations of associative thickeners have been found to be less sensitive to colorant addition than the individual thickeners alone. Combinations of two or more associative thickeners are commonly used in paints to obtain the desired balance of high and low shear rate viscosities. These common combinations include a pseudoplastic associative thickener to control the low to mid shear viscosity and a more Newtonian associative thickener to control the high shear viscosity. US 2007/0155880 discloses that by selecting two associative thickeners of a higher and a lower molecular weight and utilizing them in combination in certain concentration ratios, enhanced viscosity stability upon tinting can be obtained. U.S. Pat. No. 5,137,571 discloses methods for using cyclodextrin-containing compounds with associative thickeners for a number of uses, including to reduce the viscosity drop of formulations upon addition of the colorants to the formulations. This approach adds cost to the formulation, can make handling of the unthickened paint during manufacturing and filling more difficult, and gives a wide range of final, tinted viscosities that depend on the colour formula.

Efforts are being continuously made to solve the problem of reduction in viscosity upon addition of colorants in water-borne paint and coating formulations.

US 2009/0318595 discloses methods for preparing urethane based nonionic associative thickeners which included forming a polyether polyol polymer/hydrophobe melt. The hydrophobe comprised an aromatic group. An isocyanurate trimer and a di-isocyanate were introduced to the polyether polyol polymer/hydrophobe melt. After introduction of the isocyanurate trimer and di-isocyanate compositions, the polyether polyol polymer/hydrophobe melt was heated at a temperature sufficient to produce the thickener for waterborne compositions that include high amounts of pigments.

US 2005/0150418 A1 discloses paint compositions using colorant compatible synthetic thickeners. More specifically, the invention relates to the use in paint compositions a synthetic thickener with a water-soluble or water-swellable polymer backbone that has terminal groups of hydrophobes of oligomers of alkyl- or aryl compounds containing a polymerizable cyclic monomer (i.e., an epoxide, a glycidyl ether, a cyclic oxide, an oxazoline) or a polymerizable double bond (i.e., styrene, vinyl ether, acrylamides, acrylates), or derivatives thereof.

As the coloured paint market continues to grow, the currently available approaches to mitigating viscosity drop all have limitations. Thus, there is an ongoing need to provide compositions which can be used as an additive in water-borne paint and coating formulations that reduce the viscosity loss on tinting.

Therefore, it was an object of the presently claimed invention to provide a composition which is stable and which upon use as an additive in water-borne paint and coating formulations reduces the viscosity loss on tinting thereby providing better viscosity stability upon colorant addition.

SUMMARY OF THE INVENTION

Surprisingly, it has been found that a composition comprising—i) at least one polyurethane polymer obtained by reacting at least one polyol, at least one aliphatic alcohol which is a Guerbet alcohol with unsubstituted alkyl having greater than 12 carbon atoms and less than 24 carbon atoms, i.e. an alkyl having 13 to 23 carbon atoms, and at least one difunctional isocyanate; ii) at least one diluent based on alkoxylated alcohols having alkyl with 7 to 11 carbon atoms and at least 5 alkoxy groups; and iii) water, is stable and suitable for use as an additive for paint formulations and shows less viscosity loss on tinting when composition is added to paint formulations as an additive.

The inventors surprisingly found that using hydrophobically modified polyurethane polymer derived from a difunctional isocyanate, a polyol and a Guerbet alcohol with unsubstituted alkyl having greater than 12 carbon atoms and less than 24 carbon atoms in combination with a diluent based on alkoxylated alcohols having alkyl with 7 to 11 carbon atoms and at least 5 alkoxy groups with water provides a composition which is stable and which when added to the paint formulations reduces the viscosity loss on tinting thereby providing better viscosity stability upon colorant addition. The composition according to the present invention is useful for a wide range of applications such as paint, lacquer, water-borne coating formulation, architectural coating, tint stable paint and coating, industrial coating, varnish, paper coating, wood coating, plastic, tile, adhesive, cosmetic formulation, detergent formulation, textile and drilling muds plaster formulations, formulations for plasterboard, for hydraulic binders such as mortar formulations, formulations for ceramics and for leather.

In the following, specific embodiments of the present invention are described:

1. In an embodiment, the presently claimed invention provides a composition comprising:
   (A) ≥10 wt.-% to ≤50 wt.-% of at least one polyurethane polymer obtainable by reacting:
      (a) at least one polyol selected from the group consisting of polyalkylene glycols and polyvinyl alcohols,
      (b) at least one aliphatic alcohol of formula (I), $(R^1)(R^2)$—CHCH$_2$—O    (I)

wherein
      $R^1$ and $R^2$, independently of each other, are linear or branched, unsubstituted alkyl having 3, 4, 5, 6, 7, 8, 9, 10, 11 or 12 carbon atoms, and the sum of the carbon atoms in $R^1$ and $R^2$ is 11, 12, 13, 14, 15, 16, 17, 18, 19, 20 or 21, and
      (c) at least one difunctional isocyanate,
   (B) ≥12 wt.-% to ≤25 wt.-% of at least one diluent of formula (II),

    (II)

wherein
      $R^3$ is linear or branched, unsubstituted alkyl having 7, 8, 9, 10 or 11 carbon atoms, $R^4$ is an ethylene group,
      $R^5$ is a propylene group,
      is an integer in the range of ≥5 to ≤25, y is an integer in the range of ≥0 to ≤50, and the sum of x+y is an integer in the range of ≥5 to ≤50, and
   (C) ≥30 wt.-% to ≤75 wt.-% of water,
      wherein wt.-% is based on the total weight of the composition.

2. The composition according to embodiment 1, wherein the at least one polyol (a) is a polyalkylene glycol of formula (III),

wherein
   $R^6$ is $C_2$-$C_4$-alkylene and m is an integer in the range of ≥15 to ≤500.

3. The composition according to embodiment 2, wherein in the polyalkylene glycol of formula (III) $R^6$ is ethylene and m is in the range of ≥50 to ≤500.

4. The composition according to one or more of embodiments 1 to 3, wherein in the at least one polyol (a), the weight average molecular weight $M_w$ of the polyalkylene glycol is in the range of ≥3000 g/mol to ≤20000 g/mol determined according to DIN 55672-1.

5. The composition according to one or more of embodiments 1 to 4, wherein in the at least one polyol (a), the weight average molecular weight $M_w$ of the polyvinyl alcohol is in the range of ≥6000 g/mol to ≤10000 g/mol determined according to DIN 55672-1.

6. The composition according to one or more of embodiments 1 to 5, wherein in the at least one polyurethane polymer (A), the at least one polyol (a) is present in an amount in the range of ≥50 wt.-% to ≤90 wt.-%, based on the total weight of the polyurethane polymer (A).

7. The composition according to one or more of embodiments 1 to 6, wherein in the at least one polyurethane polymer (A), the at least one aliphatic alcohol (b) of formula (I) is at least two aliphatic alcohol (b) of formula (I).

8. The composition according to one or more of embodiments 1 to 7, wherein in the aliphatic alcohol (b) of formula (I), $R^1$ and $R^2$ are, independently of one another, selected from the group consisting of n-propyl, n-butyl, n-pentyl, n-hexyl, n-heptyl, n-octyl, n-nonyl, n-decyl, n-undecyl, n-dodecyl, isopropyl, isobutyl, isopentyl, isohexyl, isoheptyl, isooctyl, isodecyl, isoundecyl and isododecyl.

9. The composition according to one or more of embodiments 1 to 8, wherein in the aliphatic alcohol (b) of formula (I), $R^1$ and $R^2$ are, independently of one another selected from the group consisting of n-hexyl, n-octyl, n-decyl, isohexyl, isooctyl and isodecyl.

10. The composition according to one or more of embodiments 1 to 9, wherein in the aliphatic alcohol (b) of formula (I), $R^1$ and $R^2$ are, independently of one another selected from the group consisting of n-hexyl, n-octyl and n-decyl.

11. The composition according to one or more of embodiments 1 to 10, wherein in the at least one polyurethane polymer (A), the at least one aliphatic alcohol (b) of formula (I) is present in an amount in the range of ≥5 wt.-% to ≤20 wt.-%, based on the total weight of the polyurethane polymer (A).

12. The composition according to one or more of embodiments 1 to 11, wherein in the at least one polyurethane polymer (A), the at least one difunctional polyisocyanate (c) is selected from the group consisting of 1,5-naphthalene diisocyanate, 4,4-diphenylmethane diisocyanate (MDI), hydrogenated MDI (H$_{12}$MDI), xylylene diisocyanate (XDI), tetramethylxylene diisocyanate (TMXDI), 4,4-diphenyldimethylmethane diisocyanate, di- and tetraalkyldiphenylmethane diisocyanate, 4,4-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 4,4-diisocyanatophenylperfluoroethane, tetramethoxybutane 1,4-diisocyanate, butane 1,4-diisocyanate, dicyclohexylmethane diisocyanate, cyclohexane 1,4-diisocyanate, ethylene diisocyanate, bis-isocyanatoethyl phthalate, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate or 1,4-diisocyanatobutane, 1,2-diisocyanatododecane and isophorone diisocyanate (IPDI).

13. The composition according to one or more of embodiments 1 to 12, wherein in the at least one polyurethane polymer (A), the at least one difunctional polyisocyanate (c) is selected from the group consisting of isophorone diisocyanate (IPDI) and tetramethylxylene diisocyanate (TMXDI).

14. The composition according to one or more of embodiments 1 to 13, wherein in the at least one polyurethane polymer (A), the at least one difunctional isocyanate (c) is present in an amount in the range of ≥5 wt.-% to ≤10 wt.-%, based on the total weight of the polyurethane polymer (A).

15. The composition according to one or more of embodiments 1 to 14, wherein in the at least one polyurethane polymer (A) the weight ratio of the at least one polyol (a), the at least one aliphatic alcohol (b) and the at least one difunctional isocyanate (c) is in the range of 5:0.5:1 to 20:5:1.

16. The composition according to one or more of embodiments 1 to 15, wherein the amount of the at least one polyurethane polymer (A) is in the range of ≥10 wt.-% to ≤40 wt.-%, based on the total weight of the composition.

17. The composition according to one or more of embodiments 1 to 16, wherein the amount of the at least one diluent (B) of formula (II) is in the range of ≥10 wt.-% to ≤20 wt.-%, based on the total weight of the composition.

18. The composition according to one or more of embodiments 1 to 17, wherein in the at least one diluent (B) of formula (II), $R^3$ is having 8, 9 or 10 carbon atoms.

19. The composition according to one or more of embodiments 1 to 18, wherein in the at least one diluent (B) of formula (II), x is in the range of ≥6 to ≤10.

20. The composition according to one or more of embodiments 1 to 19, wherein in the at least one diluent (B) of formula (II), y is in the range of ≥0 to ≤10.

21. The composition according to one or more of embodiments 1 to 20, wherein the amount of water (C) is in the range of ≥40 wt.-% to ≤75 wt.-%, based on the total weight of the composition.

22. The composition according to one or more of embodiments 1 to 21, wherein the composition has a viscosity in the range of ≥0.01 Pa·s to ≤100 Pa·s at a temperature of 23° C.±0.2° C., determined according to DIN EN ISO 3219.

23. The composition according to one or more of embodiments 1 to 22, wherein the composition has a viscosity in the range of ≥0.1 Pa·s to ≤50 Pa·s at a temperature of 23° C.±0.2° C., determined according to DIN EN ISO 3219.

24. The composition according to one or more of embodiments 1 to 23, wherein the composition has a viscosity in the range of ≥1 Pa·s to ≤10 Pa·s, at a temperature of 23° C.±0.2° C., determined according to DIN EN ISO 3219.

25. The composition according to one or more of embodiments 1 to 24, wherein the composition comprises biocides, stabilizers and complexing agents.

26. A composition according to one or more of embodiments 1 to 25 comprising:
(A) ≥10 wt.-% to ≤50 wt.-% of at least one polyurethane polymer obtainable by reacting:
  (a) 50 wt.-% to 90 wt.-% at least one polyol selected from the group consisting of polyalkylene glycol of formula (III),

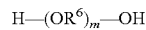

wherein
  $R^6$ is ethylene and m is an integer in the range of 15 to 250, and polyvinyl alcohols,
  (b) ≥5 wt.-% to ≤20 wt.-% of at least one aliphatic alcohol of formula (I),

wherein
  $R^1$ and $R^2$, independently of each other, are selected from the group consisting of n-hexyl, n-octyl, n-decyl, isohexyl, isooctyl and isodecyl, and
  (c) ≥5 wt.-% to ≤10 wt.-% of at least one difunctional isocyanate selected from the group consisting of isophorone diisocyanate (IPDI) and tetramethylxylene diisocyanate (TMXDI),
(B) ≥12 wt.-% to ≤25 wt.-% of at least one diluent of formula (II),

wherein
$R^3$ is 8, 9 or 10 carbon atoms,
$R^4$ is an ethylene group,
$R^5$ is a propylene group,
x is an integer in the range of ≥6 to ≤10, y is an integer in the range of ≥0 to ≤50, and the sum of x+y is an integer in the range of ≥5 to ≤50, and
(C) ≥30 wt.-% to ≤75 wt.-% of water,
wherein wt.-% is based on the total weight of the composition.

27. A method of preparing a composition according to one or more of embodiments 1 to 26, comprising—
i) obtaining ≥10 wt.-% to ≤50 wt.-% of at least one polyurethane polymer (A) by reacting—
  (a) at least one polyol selected from the group consisting of polyalkylene glycols and polyvinyl alcohols,
  (b) at least one aliphatic alcohol of formula (I),

wherein
  $R^1$ and $R^2$, independently of each other, are linear or branched, unsubstituted alkyl having 3, 4, 5, 6, 7, 8, 9, 10, 11 or 12 carbon atoms, and the sum of the carbon atoms in $R^1$ and $R^2$ is 11, 12, 13, 14, 15, 16, 17, 18, 19, 20 or 21, and
  (c) at least one difunctional isocyanate,
    wherein the polylkylene glycol and the at least one aliphatic alcohol (b) are pre-dried until water content is in the range of ≥0 wt.-% to ≤0.1 wt.-% by weight.
ii) adding ≥12 wt.-% to ≤25 wt.-% of at least one diluent (B) of formula (II),

wherein

R³ is linear or branched, unsubstituted alkyl having 7, 8, 9, 10 or 11 carbon atoms, R⁴ is an ethylene group, R⁵ is a propylene group, x is an integer in the range of ≥5 to ≤25, y is an integer in the range of ≥0 to ≤50, and the sum of x+y is an integer in the range of ≥5 to ≤50, and ≥30 wt.-% to ≤75 wt.-% of water (C) to the at least one polyurethane polymer (A) obtained in step (i), in the presence of at least one catalyst.

28. The method according to embodiment 27, wherein the at least one catalyst is selected from the group consisting of metal carbonate, metal borate, metal carboxylate, organic carboxylate, organic metal sulfonate, metal alkane complex, metal acylate and metal oxide, acetic acid, methane sulfonic acid, ethane sulfonic acid, 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid, naphthalene-2-sulfonic acid, hydrochloric acid, sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-diazabicyclo[2.2.2]octane (DABCO).

29. The method according to embodiment 28, wherein the at least one catalyst is 1,8-diazabycyclo[5.4.0]undec-7-en (DBU).

30. An aqueous composition which comprises ≥0.01 wt.-% to ≤10 wt.-%, based on the total weight of the aqueous composition, of the composition according to one or more of embodiments 1 to 26 or the composition which is obtained according to the method of one or more of embodiments 27 to 29, and ≥15 wt.-% to ≤99.9 wt.-%, based on the total weight of the aqueous composition of at least one of the components, selected from the group consisting of pigment pastes, binders, fillers, solvents, defoamers, neutralising agent, wetting agent, pigment dispersing agents, preservatives and water.

31. The aqueous composition according to embodiment 30, wherein the active content of the composition according to one or more of embodiments 1 to 26 or the composition which is obtained according to the method of one or more of embodiments 27 to 29 in the aqueous composition is in the range of 15% to 50%.

32. The aqueous composition according to one embodiments 30 or 31, wherein the composition is a paint, lacquer, water-borne coating formulation, architectural coating, tint stable paint and coating, industrial coating, varnish, paper coating, wood coating, plastic, tile, adhesive, cosmetic formulation, detergent formulation, textile and drilling muds plaster formulation, formulations for plasterboard, for hydraulic binders such as mortar formulation, formulations for ceramics and for leather.

33. Use of the composition according to one or more of embodiments 1 to 26 or the composition which is obtained according to the method of one or more of embodiments 27 to 29 in aqueous compositions as a thickener for coating formulations for obtaining reduced viscosity loss on tinting.

34. Method of providing thickening properties to the aqueous composition comprising the steps of:

i) preparing a composition according to one or more of embodiments 1 to 26 by the method according to one or more of embodiments 27 to 29; and ii) dispersing the composition of step i) into an aqueous composition according to embodiments 30 or 31 thereby providing thickening effect to the aqueous composition.

35. A paint composition comprising— i) a base paint comprising ≥15 wt.-% to ≤99.9 wt.-%, of at least one of the components, selected from the group consisting of binders, fillers, solvents, defoamers, neutralising agent, wetting agent, pigment dispersing agents, preservatives and water;

ii) ≥0.1 wt.-% to ≤15 wt.-% of pigment pastes; and iii) ≥0.01 wt.-% to ≤10 wt.-% of the composition according to one or more of embodiments 1 to 26 or the composition which is obtained according to the method of one or more of embodiments 27 to 29.

wherein wt.-% is based on the total weight of the composition.

36. A composition consisting of:

(A) ≥10 wt.-% to ≤50 wt.-% of at least one polyurethane polymer obtainable by reacting:

(a) at least one polyol selected from the group consisting of polyalkylene glycols and polyvinyl alcohols, (b) at least one aliphatic alcohol of formula (I),

$$(R^1)(R^2)\text{---}CHCH_2\text{---}OH \qquad (I)$$

wherein

R¹ and R², independently of each other, are linear or branched, unsubstituted alkyl having 3, 4, 5, 6, 7, 8, 9, 10, 11 or 12 carbon atoms, and the sum of the carbon atoms in R¹ and R² is 11, 12, 13, 14, 15, 16, 17, 18, 19, 20 or 21, and (c) at least one difunctional isocyanate, (B) ≥12 wt.-% to ≤25 wt.-% of at least one diluent of formula (II),

$$R^3\text{---}(OR^4)_x(OR^5)_y\text{---}OH \qquad (II)$$

wherein

R³ is linear or branched, unsubstituted alkyl having 7, 8, 9, 10 or 11 carbon atoms, R⁴ is an ethylene group, R⁵ is a propylene group, x is an integer in the range of ≥5 to ≤25, y is an integer in the range of ≥0 to ≤50, and the sum of x+y is an integer in the range of ≥5 to ≤50, and (C) ≥30 wt.-% to ≤75 wt.-% of water, wherein wt.-% is based on the total weight of the composition.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The presently claimed invention is directed to a composition which is used as an additive in coating formulations, in particular water-borne paint and coating formulations, for reducing the effect of the viscosity loss caused by the addition of colorants/pigment pastes to the paint and coating formulations, thereby improving the viscosity stability in tinted coating formulations.

The composition is obtained by adding—i) at least one polyurethane polymer obtained by reacting at least one polyol, at least one aliphatic alcohol which is a Guerbet alcohol with unsubstituted alkyl having greater than 12 carbon atoms and less than 24 carbon atoms, i.e. alkyl having 13 to 23 carbon atoms, and at least one difunctional isocyanate; ii) at least one diluent based on alkoxylated alcohols having alkyl with 7 to 11 carbon atoms and at least 5 alkoxy groups; and iii) water. The composition is stable and suitable for use as an additive for paint formulations and shows less viscosity loss on tinting when the composition is added to paint formulations as an additive.

The term "waterborne coating compositions" refer to coatings that contain water as the major volatile component and utilize water to dilute the coating to application consistency. These coatings include, but are not limited to, resinous binder, pigments, water, and organic solvent, or mixtures thereof. Examples of waterborne coating compositions include, but are not limited to, latex paint, architectural paints, plastic, wood coatings, metal coatings for automotive finishes, coatings, synthetic plaster, adhesives, sealants, and inks.

The term "associative thickener" refers to any hydrophobically modified water-soluble polymer capable of interacting in aqueous solution with itself and with another species. The inclusion of hydrophobic modification enhances the ability of a water-soluble polymer to thicken water or to interact with other hydrophobic species and surfaces. These other hydrophobic species include, but are not limited to, the hydrophobe of a surfactant, the surface of a latex particle, the hydrophobic surface of pigments, or any other component of a waterborne coating composition.

The term "aqueous composition" shall mean a composition that is provided predominantly in water rather than organic solvent. It is contemplated, however, that a minor amount of organic solvent may be included in the composition and that the composition will nonetheless meet the definition of "aqueous composition".

As used herein, "base paint" shall mean an uncolored paint in liquid form to be colored or tinted. To enable the uncolored paint to be colored or tinted to varying degrees in its final form. In context of the present invention base paint does not contain the composition of the present invention as an additive (thickener).

The term "pigment," refers to a substance that imparts color to another substance or mixture. Pigments are usually present in the form of organic or inorganic dry powders. A "colorant" is also a substance that imparts color to another substance or mixture, and generally includes at least one pigment and other additives. Dry pigments may be insoluble in organic solvents and water, which can necessitate wetting, disaggregation and deagglomeration before dispersion can take place and enable the production of a stable, colloidal pigmentary dispersion in the paint formulation. The wetting process may be accomplished through the use of wetting agents, which typically are surfactants. Surfactants stabilize the pigment dispersions.

The term "alkyl" denotes a saturated moiety constituted solely of atoms of carbon and of hydrogen.

The term "aliphatic alcohol" as used herein denotes organic compounds containing one or more hydroxyl groups attached to an alkyl radical.

As used herein, "branched" denotes a chain of atoms with one or more side chains attached to it. Branching occurs by the replacement of a substituent, e.g., a hydrogen atom, with a covalently bonded aliphatic moiety.

Guerbet alcohols are used in the present invention. Guerbet alcohols are branched, primary monofunctional alcohols that have two linear carbon chains with the branch point always at the second carbon position. Guerbet alcohols are chemically described as 2-alkyl-1-alkanols. Reference is made by way of example to "Alcohols, Aliphatic", page 10 in Ullmann's Encyclopedia of Industrial Chemistry, Seventh Edition, Electronic Release, 2008, Wiley-VCH, Weinheim, N.Y., and the literature cited there. In the course of the Guerbet reaction, primary alcohols are ultimately dimerized to α-branched primary alcohols in the presence of suitable catalysts. According to the literature, the primary products formed from the alcohols are aldehydes which subsequently dimerize to saturated alcohols by aldol condensation with elimination of water and subsequent hydrogenation. The Guerbet alcohol according the present invention is represented by the following formula:

$$(R^1)(R^2)\text{—CHCH}_2\text{—OH} \tag{I}$$

wherein $R^1$ and $R^2$, independently of each other, are linear or branched, unsubstituted alkyl having 3, 4, 5, 6, 7, 8, 9, 10, 11 or 12 carbon atoms, and the sum of the carbon atoms in $R^1$ and $R^2$ is 11, 12, 13, 14, 15, 16, 17, 18, 19, 20 or 21.

The term "viscosity stability" shall mean the ability of a composition to resist change in viscosity upon addition of the colorant/pigment pastes.

The term "viscosity loss on tinting" shall mean drop in viscosity of the paint and coating formulation comprising an associative thickener as an additive, when colorant/pigment pastes are added to said paint and coating formulation.

The term "low shear viscosity" is indicative of paint viscosity when it is in the can and after it has been applied to the wall. In context of the present invention, low shear viscosity is exhibited when the applied shear rate is in the range of 0.1 $s^{-1}$ to 400 $s^{-1}$. The viscosity is determined at a temperature of 23° C.±0.2° C., according to DIN EN ISO 3219.

The term "neat viscosity" refers to the viscosity of the composition which includes polyurethane polymer, diluent and water.

The term "active content" of the composition refers to the content (in wt.-%) of the polyurethane polymer which includes the products obtained during the reaction of polyol, aliphatic alcohol and diisocyanate.

In an embodiment according to the presently claimed invention, in the at least one polyurethane polymer (A), the at least one polyol (a) is selected from the group consisting of polyalkylene glycols and polyvinyl alcohols.

In an embodiment according to the presently claimed invention the, in the at least one polyurethane polymer (A), the at least one polyol is a polyalkylene glycol of formula (III),

$$H—(OR^6)_m—OH \quad (III)$$

wherein, $R^6$ is $C_2$-$C_4$-alkylene and m is an integer in the range of ≥15 to ≤500.

In an embodiment according to the presently claimed invention, in formula (III), $R^6$ is selected from the group consisting of ethylene, propylene and butylene, or a combination thereof. For example, the $OR^6$ group is selected from the group consisting of ethyleneoxy, 1-propyleneoxy, 2-propyleneoxy, 1-butyleneoxy, 2-butyleneoxy, or combinations thereof.

In an embodiment according to the presently claimed invention, in formula (III), m is an integer in the range of ≥50 to ≤500, or ≥55 to ≤400, preferably ≥65 to ≤350, more preferably ≥75 to ≤300, further more preferably ≥75 to ≤250, and most preferably ≥100 to ≤250.

In an embodiment according to the presently claimed invention, the at least one polyol is a polyvinyl alcohol.

In an embodiment of the presently claimed invention the at least one aliphatic alcohol (b) is represented by formula (I),

$$(R^1)(R^2)—CHCH_2—OH \quad (I)$$

wherein, $R^1$ and $R^2$, independently of each other, are linear or branched, unsubstituted alkyl having 3, 4, 5, 6, 7, 8, 9, 10, 11 or 12 carbon atoms, such that the sum of the carbon atoms in $R^1$ and $R^2$ is 11, 12, 13, 14, 15, 16, 17, 18, 19, 20 or 21.

In another embodiment of the presently claimed invention, $R^1$ and $R^2$, independently of each other, are linear or branched, unsubstituted alkyl having 2, 3, 4, 5, 6, 7, 8 or 9 carbon atoms such that the sum of the carbon atoms in $R^1$ and $R^2$ is 11.

In another embodiment of the presently claimed invention, $R^1$ and $R^2$, independently of each other, are linear or branched, unsubstituted alkyl having 3, 4, 5, 6, 7, 8 or 9 carbon atoms such that the sum of the carbon atoms in $R^1$ and $R^2$ is 12.

In another embodiment of the presently claimed invention, $R^1$ and $R^2$, independently of each other, are linear or branched, unsubstituted alkyl having 3, 4, 5, 6, 7, 8, 9 or 10 carbon atoms such that the sum of the carbon atoms in $R^1$ and $R^2$ is 13.

In another embodiment of the presently claimed invention, $R^1$ and $R^2$, independently of each other, are linear or branched, unsubstituted alkyl having 3, 4, 5, 6, 7, 8, 9, 10 or 11 carbon atoms such that the sum of the carbon atoms in $R^1$ and $R^2$ is 14.

In another embodiment of the presently claimed invention, $R^1$ and $R^2$, independently of each other, are linear or branched, unsubstituted alkyl having 3, 4, 5, 6, 7, 8, 9, 10, 11 or 12 carbon atoms such that the sum of the carbon atoms in $R^1$ and $R^2$ is 15.

In another embodiment of the presently claimed invention, $R^1$ and $R^2$, independently of each other, are linear or branched, unsubstituted alkyl having 4, 5, 6, 7, 8, 9, 10, 11, or 12 carbon atoms such that the sum of the carbon atoms in $R^1$ and $R^2$ is 16.

In another embodiment of the presently claimed invention, $R^1$ and $R^2$, independently of each other, are linear or branched, unsubstituted alkyl having 5, 6, 7, 8, 9, 10, 11 or 12 carbon atoms such that the sum of the carbon atoms in $R^1$ and $R^2$ is 17.

In another embodiment of the presently claimed invention, $R^1$ and $R^2$, independently of each other, are linear or branched, unsubstituted alkyl having 6, 7, 8, 9, 10, 11 or 12 carbon atoms such that the sum of the carbon atoms in $R^1$ and $R^2$ is 18.

In another embodiment of the presently claimed invention, $R^1$ and $R^2$, independently of each other, are linear or branched, unsubstituted alkyl having 7, 8, 9, 10, 11 or 12 carbon atoms such that the sum of the carbon atoms in $R^1$ and $R^2$ is 19.

In another embodiment of the presently claimed invention, $R^1$ and $R^2$, independently of each other, are linear or branched, unsubstituted alkyl having 8, 9, 10, 11 or 12 carbon atoms such that the sum of the carbon atoms in $R^1$ and $R^2$ is 20.

In another embodiment of the presently claimed invention, $R^1$ and $R^2$, independently of each other, are linear or branched, unsubstituted alkyl having 9, 10, 11 or 12 carbon atoms such that the sum of the carbon atoms in $R^1$ and $R^2$ is 21.

In an embodiment according to the presently claimed invention, in the at least one polyurethane polymer (A), the at least one aliphatic alcohol (b) of formula (I) is at least two aliphatic alcohol (b) of formula (I).

In an embodiment according to the presently claimed invention, in the at least one aliphatic alcohol (b) of formula (I), $R^1$ and $R^2$ are, independently of one another, selected from the group consisting of n-propyl, n-butyl, n-pentyl, n-hexyl, n-heptyl, n-octyl, n-nonyl, n-decyl, n-undecyl, n-dodecyl, isopropyl, isobutyl, isopentyl, isohexyl, isoheptyl, isooctyl, isodecyl, isoundecyl and isododecyl, preferably selected from the group consisting of n-hexyl, n-octyl, n-decyl, isohexyl, isooctyl and isodecyl, more preferably selected from the group consisting of n-hexyl, n-octyl and n-decyl.

In a preferred embodiment according to the presently claimed invention, the at least one aliphatic alcohol (b) is selected from the group consisting of 2-pentyl-1-nonanol, 2-hexyl-1-decanol, 2-heptyl-1-undecanol, 2-octyl-1-dodecanol and 2-nonyl-1-tridecanol.

In an embodiment according to the presently claimed invention, in the at least one polyurethane polymer (A), in the at least two aliphatic alcohol (b) of formula (I), $R^1$ and $R^2$ are, independently of one another, selected from the group consisting of n-propyl, n-butyl, n-pentyl, n-hexyl, n-heptyl, n-octyl, n-nonyl, n-decyl, n-undecyl, n-dodecyl, isopropyl, isobutyl, isopentyl, isohexyl, isoheptyl, isooctyl, isodecyl, isoundecyl and isododecyl, preferably selected from the group consisting of n-hexyl, n-octyl, n-decyl, isohexyl, isooctyl and isodecyl, more preferably selected from the group consisting of n-hexyl, n-octyl and n-decyl.

In an embodiment of the presently claimed invention the at least one difunctional isocyanate is selected from the group consisting of 1,5-naphthalene diisocyanate, 4,4-diphenylmethane diisocyanate (MDI), hydrogenated MDI (H12MDI), xylylene diisocyanate (XDI), tetramethylxylene diisocyanate (TMXDI), 4,4-diphenyldimethylmethane diisocyanate, di- and tetraalkyldiphenylmethane diisocyanate, 4,4-dibenzyl diisocyanate, 1,3-phenylene diisocyanate, 1,4-phenylene diisocyanate, the isomers of tolylene diisocyanate (TDI), 1-methyl-2,4-diioscyanatocyclohexane, 1,6-diisocyanato-2,2,4-trimethylhexane, 1,6-diisocyanato-2,4,4-trimethylhexane, 4,4-diisocyanatophenylperfluoroethane, tetramethoxybutane 1,4-diisocyanate, butane 1,4-diisocyanate, dicyclohexylmethane diisocyanate, cyclohexane 1,4-diisocyanate, ethylene diisocyanate, bis-isocyanatoethyl phthalate, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate or 1,4-diisocyanatobutane, 1,2-diisocyanatododecane and isophorone diisocyanate (IPDI).

In a preferred embodiment of the presently claimed invention the at least one difunctional isocyanate is selected from the group consisting of tetramethylxylene diisocyanate (TMXDI), isophorone diisocyanate (IPDI) and xylylene diisocyanate (XDI).

In an embodiment according to the presently claimed invention, in the at least one polyurethane polymer (A), the at least one polyol (a) is present in an amount in the range of ≥50 wt.-% to ≤90 wt.-%, based on the total weight of the polyurethane polymer (A), preferably in the range of ≥55 wt.-% to ≤85 wt.-%, more preferably in the range of ≥60 wt.-% to ≤85 wt.-, even more preferably in the range of ≥65 wt.-% to ≤85 wt.-%, further more preferably in the range of ≥70 wt.-% to ≤85 wt.-%, and most preferably in the range of ≥75 wt.-% to ≤85 wt.-%.

In an embodiment according to the presently claimed invention, in the at least one polyol (a), the weight average molecular weight Mw of the polyalkylene glycol is in the range of ≥3000 g/mol to ≤20000 g/mol determined according to DIN 55672-1, preferably in the range of ≥3500 g/mol to ≤15000 g/mol, more preferably in the range of ≥4000 g/mol to ≤10000 g/mol, even more preferably in the range of ≥4500 g/mol to ≤10000 g/mol, further more preferably in the range of ≥5000 g/mol to ≤10000 g/mol or in the range of ≥6000 g/mol to ≤10000 g/mol and most preferably in the range of ≥7500 g/mol to ≤10000 g/mol.

In an embodiment according to the presently claimed invention, in the at least one polyurethane polymer (A), the at least one aliphatic alcohol (b) of formula (I) is present in an amount in the range of ≥5 wt.-% to ≤20 wt.-%, based on the total weight of the polyurethane polymer (A), preferably in the range of ≥6 wt.-% to ≤18 wt.-%, more preferably in the range of ≥8 wt.-% to ≤16 wt.-%, even more preferably in the range of ≥10 wt.-% to ≤15 wt.-%, and further more preferably in the range of ≥12 wt.-% to ≤15 wt.-%.

In an embodiment according to the presently claimed invention, in the at least one polyurethane polymer (A), the at least one difunctional isocyanate (c) is present in an amount in the range of ≥5 wt.-% to ≤10 wt.-%, based on the total weight of the polyurethane polymer (A), preferably in the range of ≥5 wt.-% to ≤9 wt.-% and more preferably in the range of ≥6 wt.-% to ≤8 wt.-%.

In an embodiment according to the presently claimed invention, in the at least one polyurethane polymer (A), the weight ratio of the at least one polyol (a), the at least one aliphatic alcohol (b) and the at least one difunctional isocyanate (c) is in the range of 5:0.5:1 to 20:5:1, preferably in the range of 5:0.5:1 to 15:3:1, more preferably in the range of 5:1:1 to 15:2.5:1, and most preferably in the range of 7:2:1 to 10:2.5:1.

In an embodiment according to the presently claimed invention, the amount of the at least one polyurethane polymer (A) is in the range of ≥10 wt.-% to ≤50 wt.-%, based on the total weight of the composition, preferably in the range of ≥10 wt.-% to ≤40 wt.-%, more preferably in the range of ≥12 wt.-% to ≤35 wt.-%, even more preferably in the range of ≥12 wt.-% to ≤30 wt.-%, further more preferably in the range of ≥15 wt.-% to ≤30 wt.-%, and most preferably in the range of 15 wt.-% to 20 wt.-%.

In an embodiment according to the presently claimed invention, the amount of the at least one diluent (B) of formula (II) is in the range of ≥12 wt.-% to ≤25, wt.-%, based on the total weight of the composition, preferably in the range of in the range of ≥12 wt.-% to ≤22 wt.-%, more preferably in the range of ≥10 wt.-% to ≤22 wt.-%, and most preferably in the range of ≥10 wt.-% to ≤20 wt.-%.

In an embodiment according to the presently claimed invention, in the least one diluent of formula (II), $R^3$ is linear or branched, unsubstituted alkyl having 7, 8, 9, 10 or 11 carbon atoms, and preferably $R^3$ is having 8, 9 or 10 carbon atoms.

In an embodiment according to the presently claimed invention, in the at least one diluent (B) of formula (II), x is in the range of ≥5 to ≤25, preferably in the range of ≥5 to ≤20, more preferably in the range of ≥6 to ≤20, even more preferably in the range of ≥6 to ≤15 and most preferably in the range of ≥6 to ≤10.

In an embodiment according to the presently claimed invention, in the at least one diluent (B) of formula (II), y is in the range of ≥0 to ≤50, preferably in the range of ≥2 to ≤40, more preferably in the range of ≥4 to ≤30, even more preferably in the range of ≥5 to ≤20, further more preferably in the range of ≥5 to ≤15, and most preferably in the range of ≥5 to ≤10.

In an embodiment according to the presently claimed invention, in the at least one diluent (B) of formula (II), the sum of x+y is an integer in the range from ≥5 to ≤50, preferably in the range of ≥6 to ≤40, more preferably in the range of ≥6 to ≤30, even more preferably in the range of ≥6 to ≤25, further more preferably in the range of ≥6 to ≤20, and most preferably in the range of ≥6 to ≤10.

In an embodiment according to the presently claimed invention, the amount of water (C) is in the range of ≥30 wt.-% to ≤75 wt.-%, based on the total weight of the composition, preferably in the range of ≥35 wt.-% to ≤75 wt.-%, more preferably in the range of ≥40 wt.-% to ≤75 wt.-%, even more preferably in the range of ≥50 wt.-% to ≤75 wt.-%, and most preferably in the range of ≥55 wt.-% to ≤75 wt.-%.

In an embodiment according to the presently claimed invention, the composition has a viscosity in the range of $\geq 0.01$ Pa·s to $\leq 100$ Pa·s at a temperature of 23° C.±0.2° C., determined according to DIN EN ISO 3219, preferably in the range of $\geq 0.1$ Pa·s to $\leq 50$ Pa·s, more preferably in the range of $\geq 0.5$ Pa·s to $\leq 40$ Pa·s, even more preferably in the range of $\geq 1$ Pa·s to $\leq 20$ Pa·s, further more preferably in the range of $\geq 1.5$ Pa·s to $\leq 10$ Pa·s, and most preferably in the range of $\geq 1$ Pa·s to $\leq 10$ Pa·s.

In an embodiment according to the presently claimed invention, the composition comprises biocides, stabilizers and complexing agents.

In an embodiment according to the presently claimed invention, the composition comprise a biocide which is selected from the group consisting of methylisothiazolinone (MIT), benzisothiazolinone (BIT), Na-pyrithione, Zn-pyrithioneor mixtures thereof.

In a preferred embodiment according the presently claimed invention, the biocide is present in the range of $\geq 0$ wt.-% to $\leq 1$ wt.-%, preferably $\geq 0.001$ wt.-% to $\leq 1$ wt.-%, more preferably in the range of $\geq 0.01$ wt.-% to $\leq 1$ wt.-%, even more preferably in the range of $\geq 0.1$ wt.-% to $\leq 1$ wt.-%, and most preferably in the range of $\geq 0.1$ wt.-% to $\leq 0.5$ wt.-%.

In a preferred embodiment, the presently claimed invention provides a composition comprising:
(A) $\geq 15$ wt.-% to $\leq 45$ wt.-% of at least one polyurethane polymer obtainable by reacting:
  (a) $\geq 55$ wt.-% to $\leq 85$ wt.-% at least one polyol selected from the group consisting of polyalkylene glycol of formula (III), H—(OR$^6$)$_m$—OH wherein
R$^6$ is ethylene and m is an integer in the range of $\geq 15$ to $\leq 250$, and polyvinyl alcohols,
  (b) $\geq 10$ wt.-% to $\leq 15$ wt.-% of at least one aliphatic alcohol of formula (I), (R$^1$)(R$^2$)—CHCH$_2$—OH        (I)

wherein
R$^1$ and R$^2$, independently of each other, are selected from the group consisting of n-hexyl, n-octyl, n-decyl, isohexyl, isooctyl and isodecyl, and
  (c) $\geq 5$ wt.-% to $\leq 10$ wt.-% of at least one difunctional isocyanate selected from the group consisting of isophorone diisocyanate and tetramethylxylene diisocyanate),
(B) $\geq 12$ wt.-% to $\leq 25$ wt.-% of at least one diluent of formula (II), R$^3$—(OR$^4$)$_x$(OR$^5$)$_y$—OH        (II)

wherein
R$^3$ is 8, 9 or 10 carbon atoms,
R$^4$ is an ethylene group,
R$^5$ is a propylene group,
x is an integer in the range from $\geq 6$ to $\leq 10$, y is an integer in the range from $\geq 0$ to $\leq 50$, and the sum of x+y is an integer in the range from $\geq 5$ to $\leq 50$, and
(C) $\geq 50$ wt.-% to $\leq 75$ wt.-% of water,
wherein wt.-% is based on the total weight of the composition.

In an embodiment, the presently claimed invention provides a method of preparing a composition comprising
i) obtaining $\geq 15$ wt.-% to $\leq 45$ wt.-% of at least one polyurethane polymer (A) by reacting (a) at least one polyol selected from the group consisting of polyalkylene glycols and polyvinyl alcohols,
(b) at least one aliphatic alcohol of formula (I), (R$^1$)(R$^2$)—CHCH$_2$—OH        (I)

wherein
R$^1$ and R$^2$, independently of each other, are linear or branched, unsubstituted alkyl having 3, 4, 5, 6, 7, 8, 9, 10, 11 or 12 carbon atoms, and the sum of the carbon atoms in R$^1$ and R$^2$ is 11, 12, 13, 14, 15, 16, 17, 18, 19, 20 or 21, and
(c) at least one difunctional isocyanate,
wherein the polyalkylene glycol and the at least one aliphatic alcohol (b) are pre-dried until the water content is in the range from $\geq 0$ wt.-% to $\leq 0.1$ wt.-% by weight.

ii) adding $\geq 12$ wt.-% to $\leq 25$ wt.-% of at least one diluent (B) of formula (II), R$^3$—(OR$^4$)$_x$(OR$^5$)$_y$—OH        (II)

wherein
R$^3$ is linear or branched, unsubstituted alkyl having 7, 8, 9, 10 or 11 carbon atoms,
R$^4$ is an ethylene group,
R$^5$ is a propylene group,
x is an integer in the range from $\geq 5$ to $\leq 25$, y is an integer in the range from $\geq 0$ to $\leq 50$, and the sum of x+y is an integer in the range from $\geq 5$ to $\leq 50$, and $\geq 50$ wt.-% to $\leq 75$ wt.-% of water (C) to the at least one polyurethane polymer (A) obtained in step (i), in the presence of at least one catalyst.

In an embodiment, the presently claimed invention provides an aqueous composition which comprises $\geq 0.01$ wt.-% to $\leq 10$ wt.-%, preferably $\geq 0.1$ wt.-% to $\leq 10$ wt.-%, more preferably $\geq 0.1$ wt.-% to $\leq 8$ wt.-%, even more preferably $\geq 0.5$ wt.-% to $\leq 5$ wt.-%, based on the total weight of the aqueous composition, of the composition according to the presently claimed invention or the composition which is obtained according to the method of the presently claimed invention, and $\geq 15$ wt.-% to 99.9$\leq$wt.-%, preferably $\geq 20$ wt.-% to $\leq 95$ wt.-%, more preferably $\geq 30$ wt.-% to $\leq 90$ wt.-%, even more preferably $\geq 40$ wt.-% to $\leq 90$ wt.-%, and most preferably $\geq 50$ wt.-% to $\leq 85$ wt.-%, based on the total weight of the aqueous composition of at least one of the components, selected from the group consisting of pigment pastes, binders, fillers, solvents, defoamers, neutralizing agent, wetting agent, pigment dispersing agents, preservatives and water.

In an embodiment of the presently claimed invention the active content of the composition in the aqueous composition is in the range of 15% to 50%, preferably in the range of 15% to 45%, more preferably in the range of 15% to 40%, even more preferably in the range of 20% to 40%, and most preferably in the range of 20% to 30%.

In an embodiment of the presently claimed invention the composition is a paint, lacquer, water-borne coating formulation, architectural coating, tint stable paint and coating, industrial coating, varnish, paper coating, wood coating, plastic, tile, adhesive, cosmetic formulation, detergent formulation, textile and drilling muds plaster formulations, formulations for plasterboard, for hydraulic binders such as mortar formulations, formulations for ceramics and for leather, preferably the composition is a water-borne coating formulation, architectural coating, wood coating, plastic, tile, tint stable paint and coating and industrial coating.

In an embodiment the presently claimed invention provides the use of the composition in aqueous compositions as a thickener for coating formulations for obtaining reduced viscosity loss on tinting.

In an embodiment the presently claimed invention provides a method of providing thickening properties to an aqueous composition comprising the steps of:

i) preparing a composition according to the present invention; and ii) dispersing the composition of step i) into an aqueous composition thereby providing thickening effect to the aqueous composition.

In an embodiment the presently claimed invention provides a paint composition comprising i) a base paint comprising ≥15 wt.-% to ≤99.9 wt.-%, preferably ≥20 wt.-% to ≤95 wt.-%, more preferably ≥30 wt.-% to ≤95 wt.-%, even more preferably ≥35 wt.-% to ≤90 wt.-%, and most preferably ≥40 wt.-% to ≤90 wt.-%, of at least one of the components, selected from the group consisting of binders, fillers, solvents, defoamers, neutralising agent, wetting agent, pigment dispersing agents, preservatives and water;

ii) ≥0.1 wt.-% to ≤15 wt.-%, preferably ≥0.1 wt.-% to ≤10 wt.-%, more preferably ≥0.1 wt.-% to ≤5 wt.-% of pigment pastes; and iii) ≥0.01 wt.-% to ≤10 wt.-%, preferably ≥0.1 wt.-% to ≤10 wt.-%, more preferably ≥0.1 wt.-% to ≤8 wt.-%, even more preferably ≥0.5 wt.-% to ≤5 wt.-%, of the composition according to the presently claimed invention, wherein wt.-% is based on the total weight of the composition.

Pigments

A water-borne coating composition may include one or more pigments and/or one or more pigment compositions. Pigment compositions may include white opacifying pigments and/or colored pigments. Colored pigments include organic pigments and inorganic pigments.

White opacifying pigments include, but are not limited to, rutile and anatase titanium dioxides, lithopone, zinc sulfide, lead titanate, antimony oxide, zirconium oxide, barium sulfide, white lead, zinc oxide, leaded zinc oxide, and the like, and mixtures thereof.

Black pigments include, but are not limited to, various carbon blacks (Pigment Black 7), channel blacks, furnace blacks, lampblacks, or mixtures thereof. Carbon blacks are available from Cabot Corporation (Boston, Mass., USA) under the names Regal®, Black Pearls®, Elftex®, Monarch®, Mogul®, and Vulcan®; from Evonik Industries under the names Printex, Special Black, and/or FW200; from Columbian Chemicals Corporation (Marietta, Ga., USA) under the name Raven; or from Mitsubishi Chemical Corporation (Japan) under the name MA.

The pigment may also be chosen from a wide range of conventional colored pigments. The colored pigment can be blue, black, brown, cyan, green, white, violet, magenta, red, orange, yellow, or mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include, but not limited to, copper phthalocyanine blue and derivatives thereof (Pigment Blue 15). Examples of quinacridones include, but are not limited to, Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include, but are not limited to, Pigment Red 43, Pigment Red 194 (Perinone Red), Pigment Red 216 (Brominated Pyranthrone Red) and Pigment Red 226 (Pyranthrone Red). Examples of perylenes include, but are not limited to, Pigment Red 123 (Vennillion), Pigment Red 149 (Scarlet), Pigment Red 179 (Maroon), Pigment Red 190 (Red), Pigment Violet 19, Pigment Red 189 (Yellow Shade Red) and Pigment Red 224. Examples of thioindigoids include, but are not limited to, Pigment Red 86, Pigment Red 87, Pigment Red 88, Pigment Red 181, Pigment Red 198, Pigment Violet 36, and Pigment Violet 38. Examples of heterocyclic yellows include, but are not limited to, Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake from a number of sources including BASF Corporation (Germany) and Sun Chemical Corporation (Carlstadt, N.J., USA). Examples of other suitable colored pigments are described in the Colour Index, 3rd edition (The Society of Dyers and Colourists, 1982).

Other examples of pigments include, but are not limited to, Hostafine® series, such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), Normandy Magenta RD-2400, Paliogen Violet 5100, Paliogen® Violet 5890, Permanent Violet VT2645, Heliogen Green L8730, Argyle Green XP-111-S, Brilliant Green Toner GR 0991, Heliogen® Blue L6900, L7020, Heliogen® Blue D6840, D7080, Sudan Blue OS, PV Fast Blue B2GO1, Irgalite Blue BCA, Paliogen® Blue 6470, Sudan III, Sudan II, Sudan IV, Sudan Orange G, Sudan Orange 220, Paliogen® Orange 3040, Ortho Orange OR 2673, Paliogen® Yellow 152, 1560, Lithol Fast Yellow 0991K, Paliotol Yellow 1840, Novoperm® Yellow FG 1, Permanent Yellow YE 0305, Lumogen Yellow D0790, Suco-Gelb L1250, Suco-Yellow D1355, Hostaperm® Pink E, Fanal Pink D4830, Cinquasia Magenta, Lithol Scarlet D3700, Toluidine Red, Scarlet for Thermoplast NSD PS PA, E.D. Toluidine Red, Lithol Rubine Toner, Lithol Scarlet 4440, Bon Red C, Royal Brilliant Red RD-8192, Oracet Pink RF, Paliogen® Red 3871K, Paliogen® Red 3340, and Lithol Fast Scarlet L4300. These pigments are available from sources such as BASF, Celanese Corporation (Dallas, Tex., USA), Claliant (Germany), and European Colour PLC (United Kingdom).

Colorant/Pigment Paste

Colorants/pigment pastes preferably include wetting agents, dispersing agents, polyethers, water, neutralizing agent, defoaming agents, preservatives etc. The classes of compounds encompassed by the polyether include polyalkylene glycols, such as low to moderate molecular weight polyethylene and polypropylene glycols; polyhydroxy ethers, such as those formed from epoxide polymerization; polysaccharide compounds, such as polysorbitan and polysorbitol; and polyalkylene oxides, such as polyethylene and polypropylene oxide. A defoaming agent may be added for ease of manufacture. Defoamers useful in practicing the present invention include materials such as, for example, mineral oil, silica oil (Drew L-474), organically modified silicone oils (Drew L-405), and the like.

Diluent

Surfactants which are preferably used as diluents for preparing the composition according to the present invention are specifically selected from d non-ionic surfactants. Particularly effective non-ionic surfactants usable in the present invention include alkoxylate alcohols such as ethoxylated and propoxylated alcohols having alkyl with 7 to 11 carbon atoms and at least 5 alkoxylated units. Some representative examples are Lutensol® ON 60 from BASF, Biodac® 610 L from Sasol Performance Chemicals, Greenbentin DE/060 from Kolb, HOESCH ID 60 from Julius Hoesch GmbH and Co., Slovasol 088 from Sasol, and Novel® 810 from Sasol.

Catalyst

The catalyst is selected from the group consisting of metal carbonate, metal borate, metal carboxylate, organic carboxylate, organic metal sulfonate, metal alkane complex, metal acylate and metal oxide, acetic acid, methane sulfonic acid, ethane sulfonic acid, 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid, naphthalene-2-sulfonic acid, hydrochloric acid, sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-diazabicyclo[2.2.2]octane (DABCO).

Biocide

A biocide is added to the composition of the present invention to eliminate or inhibit the growth of microorganisms. The biocide will generally account for between 0 and 1% by weight of the composition. Biocidal chemicals include chlorinated hydrocarbons, organometallics, halogen-releasing compounds, metallic salts, organic sulfur compounds, quaternary ammonium compounds and phenolics. A useful commercial example of biocide is Troysan 192. Kathon LS, Benzisothiazolinone (BIT) and the like. A fungicide may also be added to the colorant compositions of the present invention to eliminate or inhibit the growth of microorganisms. Non-limiting examples of fungicides include compounds such as, for example, 3-lodo-2-propynyl butyl carbamate (IPBC), chlorthalonil, Zinc Pyrithione, 2-N-octyl-4-isothiazalin-3-one, and the like. A preferred fungicide is a mixture of Zinc Pyrithione and BIT. Preferably, biocide is selected from the group consisting of methylisothiazolinone (MIT), benzisothiazolinone (BIT), Na-pyrithione, Zn-pyrithioneor mixtures thereof.

Complexing Agents

Complexing agents are selected from the group consisting of citric acid, EDTA (trilon B), Trilon M (methylglycinediacetic acid), Trilon A (nitrilotriacetic acid) gluconic acid,

Stabilizers

Examples for stabilizers are primary and secondary antioxidants, sediment abating compounds, hindered amine light stabilizers, UV absorbers, hydrolysis control agents, quenchers and flame retardants. More specifically, BHT (Butylhydroxytoluol), citric acid, gluconic acid, or salts thereof.

Fillers

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application.

Binders

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying 35 resins can be used. Binders may also be derived from polyvinylalcohol and polyvinylbutyral. Binders include latex polymers made by emulsion polymerization. For architectural coatings especially preferred latex polymers are based on acrylic emulsion polymers, styrene-acrylic emulsion polymers, vinyl acetate-acrylic emulsion polymers or emulsion polymers based on ethylene and vinyl acetate. Preferably, the binder is present in the range of from 2 to 40 weight percent, more preferably in the range of from 5 to 30 weight percent, based on the weight of the paint composition.

Neutralizing Agent

Suitable neutralizing agents are inorganic bases, organic bases, and combinations thereof. Examples of inorganic bases include but are not limited to the alkali metal hydroxides (especially lithium, sodium, potassium, magnesium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol (2-Amino-2-methyl-1-propanol), dodecylamine, cocamine, oleamine, morpholine, triamylamine, triethylamine, tetrakis(hydroxypropyl)ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above mentioned inorganic and organic bases.

Defoamers

Suitable defoamers are selected from the wide range of defoamer used for water based systems such as silicone based defoamers, emulsion defoamers, star polymer based defoamers, powder defoamers, oil based defoamers.

Solvents

The solvent is selected from any organic solvents that are typically used to prepare coating compositions. The organic solvent may include a combination of two or more solvents. Preferably, the organic solvent is an alcohol, glycol or acetone. The glycol solvent helps reduce viscosity and may aid wetting or film coalescence. Representative glycol solvents include ethylene glycol, ethylene glycol methyl ether, ethylene glycol ethyl ether, ethylene glycol monobutyl ether, ethylene glycol-2-ethylhexyl ether, propylene glycol, propylene glycol methyl ether, propylene glycol ethyl ether, propylene glycol monobutyl ether, propylene glycol-2-ethylhexyl ether, diethylene glycol, diethylene glycol methyl ether, diethylene glycol ethyl ether, diethylene glycol monobutyl ether, diethylene glycol-2-ethylhexyl ether, dipropylene glycol, dipropylene glycol methyl ether, dipropylene glycol ethyl ether, dipropylene glycol monobutyl ether, dipropylene glycol-2-ethylhexyl ether, and mixtures thereof hydrophilic glycol solvents (e.g., propylene glycol methyl ether or dipropylene glycol monomethyl ether) are preferred.

Other Rheology Modifiers

As is common in many application fields to combine different rheology modifiers, the inventive aqueous compositions like paints may contain non-inventive rheology additives in addition to the inventive HASE copolymer according to the presently claimed invention.

The composition of the presently claimed invention offers one or more of the following advantages:
1. Stable and suitable for addition to different paint and coating formulations,
2. Paint and coating formulations to which the composition of the presently claimed invention is added are less prone to loss of viscosity upon tinting, i.e. upon addition of colorants/pigments, and
3. Environment friendly due to low volatile organic content (VOC).

Having generally described the invention, a further understanding can be obtained by reference to certain specific examples which are provided herein for the purpose of illustration only, and are not intended to be limiting unless otherwise specified.

EXAMPLES

Compounds

Pluriol® E 8000, polyethylene glycol, 8000 molecular weight;
Irgazin® RED L3670 HD, diketo-pyrrolo-pyrrole used as a high performance organic pigment;
Dispex® Ultra FA 4488, phosphoric acid ester based wetting and dispersing agent for inorganic pigments;
Loxanol® PL5813, polyethylene glycol;
Foamstar® SI 2250/2210, modified polydimethyl siloxane used as defoamer in water-based coating systems;
Hydropalat® WE 3240, based on silicone oil, modified organic solvent used as a levelling agent;
Foamstar® SI 2210, fatty alcohol alkoxylate compound based on organo siloxanes;
Dispex® CX 4320, sodium salt of a carboxylic acid copolymer in water used as a wetting and dispersing agent for inorganic fillers and pigments;
Solvenon® DPM (CAS No. 34590-94-8), dipropylenglycol methylether;
Acronal® DS6277 is an anionic hydrophobic straight acrylic binder;

Lutensol® ON types are non-ionic surfactants, alkyl polyethylene glycol ethers made from a saturated synthetic short chain fatty alcohol—
Lutensol® ON 30, alkyl 010; EO 3
Lutensol® ON 60, alkyl 010; EO 6
Dehydol® range are surfactants, alkoxylated alcohols—
Dehydol® LS 6, fatty alcohol C12-C14; EO 6
Dehydol® LT 6, fatty alcohol C12-C18; EO 6
Dehydol® LT 8, fatty alcohol C12-C18; EO 8
Dehydol® TO 5, alkyl C13; EO 5
Dehydol® TO 6, alkyl C13; EO 5
Dehydol® TO 8, alkyl C13; EO 5
Dehydol® 04 deo, fatty alcohol ethoxylate, alkyl C8; EO 4
Eutanol® G16 (2-hexyl decanol)
Eutanol® G (2-octyl dodecanol); and
are available from BASF SE, Germany.
Kronos® 2190, titanium dioxide, is available from Kronos
Finntalc® M 15, Talc (Mg- Silicate) is available from Mondo Minerals B.V.
Stearyl alcohol; 2-Butyloctanol;
2-decyl-1-tetradecanol;
Ammonia;
Sodium hydroxide solution (25 wt.-%);
Isophorone diisocyanate (IPDI);
Butyl carbitol/butyl diglycol (BDG);
DBU {1,8-diazabicylco(5,4,0)undec-7-ene}; and
are available from Sigma Aldrich.

Methods

Viscosity

The reported viscosities are obtained by a rheometer at a temperature of 23° C.±0.2° C., according to a method in dependence to DIN EN ISO 3219.

Calculation Von Viscosity Drop on Tinting

For each composition (additive) the rheology of blank paint formulation and tinted paint formulation have been measured by an Anton Paar Rheometer. In order to calculate the viscosity drop on tinting ($v_{dot}$) the viscosity of the tinted sample ($\eta_{tint}$) is subtracted from the blank viscosity $\eta_0$ and divided by $\eta_0$. This analysis was done for two different shear rates (1 sec$^{-1}$, 100 sec$^{-1}$).

$$vdot = \frac{(\eta_0 - \eta_{tint})}{\eta_0}$$

Preparation of Composition (Additive)

Synthesis of polyurethane was carried out using standard procedures known in the art. One such non-limiting example is provided below.
Pluriol® E 8000 E (polyethylene glycol 8000, 200 g) was melted and dried at 110° C. under vacuum (<10 mbar) until water content <200 ppm was obtained as confirmed by Karl Fischer titration. The mixture was cooled to 90° C. under dry nitrogen atmosphere and alcohol (0.1 mol) and isocyanate (0.075 mol) were added. The mixture was stirred for 1 hour, then DBU (0.1 g) was added and stirring was continued until residual NCO content was <0.01%.

The mixture was cooled to 80° C. and the diluent and water were added. in the amounts provided in table 6.

Preparation of Pigment Paste

In a representative example, colorant/pigment paste based on Irgazin® RED L3670 HD was prepared by mixing the compounds mentioned in table 1 using a scandex shaker for 20 minutes.

TABLE 1

| Compound | Ratio |
| --- | --- |
| Dispex ® Ultra FA4488 | 8.4 |
| Loxanol ® PL 5813 | 8.0 |
| Water | 52.1 |
| Sodium hydoxide solution (25 wt.-%) | 0.5 |
| Irgazin ® Red L 3670HD | 30.0 |
| FoamStar ® SI 2250 | 0.8 |
| Preservative | 0.2 |

Preparation of Paint Formulation Based on Acronal® DS6277

In a representative example, a masterbatch (base paint) is prepared by mixing the compounds mentioned in table 2 using a dissolver, followed by an intense mixing for 30 minutes.

TABLE 2

| Compound | Ratio |
| --- | --- |
| Water | 200 |
| Ammonia | 1 |
| Hydropalat ® WE3240 | 1 |
| FoamStar ® SI 2210 | 3 |
| Dispex ® CX 4320 | 6 |
| Solvenon ® DPM | 20 |
| Kronos ® 2190 | 220 |
| Finntalc ® M15 | 50 |
| Acronal ® DS6277 | 475 |
| FoamStar ® SI 2210 | 4 |

The master batch (base paint) was split into several samples and the composition (additive) was incorporated for 10 minutes at 2000-3000 rpm using a dissolver, to form the base paint.

Preparation of Blank Paint Formulation

Blank paint formulation was prepared by mixing samples from master batch, i.e. base paint (based on Acronal® DS 6277 according to table 2) and the composition (additive) according to the present invention, as provided in table 3. Blank paint formulation is used as a reference.

TABLE 3

| Compound | Ratio |
| --- | --- |
| master batch (base paint) based on Acronal ® DS6277 | 99.6 |
| composition of present invention (additive) | 0.4 |

Preparation of Tinted Paint Formulation 5 parts of colorant/pigment paste based on Irgazin® RED L3670 HD prepared according to Table 1 are mixed together with 95 parts of paint formulation prepared according to table 3 using a dissolver for 10 minutes to obtain a tinted paint formulation as provided in table 4.

TABLE 4

| Compound | Ratio |
| --- | --- |
| paint based on Acronal ® DS6277 | 95 |
| pigment paste based on Irgazin ® RED L3670 HD | 5 |

Viscosity Loss on Tinting in Paint Formulations

I) Impact of Alcohol

In order to demonstrate the reduction in viscosity loss on tinting in paint formulations comprising the composition of the present invention as an additive, the inventors conducted experiments to demonstrate the effect of Guerbet alcohol with alkyl having greater than 12 carbon atoms and less than 24 carbon atoms, i.e. alkyl having 13 to 23 carbon atoms used for preparing the polyurethane polymer as provided in the composition of the present invention, on blank paint formulations (without colorant/pigment paste) obtained as provided in table 3 and tinted paint formulations (with colorant/pigment paste) as provided in table 4.

The composition according to the present invention was prepared according to the method described above. The compounds used in the preparation of polyurethane polymer are provided in table 5.

TABLE 5

| Example | Polyethylene glycol (Pluriol ® E 8000 E) (in g) | Alcohol (in g) | Isocyanate (IPDI) (in g) | Catalyst (DBU) (in g) |
| --- | --- | --- | --- | --- |
| 1* | 200 | stearyl alcohol (C18) (27.5) | 16.7 | 0.01 |
| 2* | 200 | 2-butyloctanol (C12) (18.9) | 16.7 | 0.01 |
| 3 | 200 | Eutanol ® G16 (C16) (24.6) | 16.7 | 0.01 |
| 4 | 200 | Eutanol ® G (C20) (30) | 16.7 | 0.01 |
| 5* | 200 | 2-decyl-1-tetradecanol (C24) (36) | 16.7 | 0.01 |

*not within the scope of the invention

The composition of the present invention which is used as an additive in the paint formulations is prepared using the polyurethane polymer as provided in table 5. The composition according to the presently claimed invention is prepared by mixing the compounds mentioned in table 6.

TABLE 6

| Example | Diluent polyurethane polymer (in wt.-%) | (Lutensol ON 60) (in wt.-%) | Water (in wt.-%) | Properties active content (in wt.-%) | appearance | neat viscosity (in Pa · s) | storage stability |
|---|---|---|---|---|---|---|---|
| 6* | example 1* (25) | 15 | 60 | 25 | Turbid | 5.27 | phase separation |
| 7* | example 2* (25) | 15 | 60 | 25 | Clear | 4.68 | stable |
| 8 | example 3 (25) | 15 | 60 | 25 | Clear | 5.8 | stable |
| 9 | example 4 (25) | 15 | 60 | 25 | Clear | 6.85 | stable |
| 10* | example 5* (25) | 15 | 60 | 25 | Clear | 12.2 | stable |

*not within the scope of the invention

The composition (additive) of the present invention as provided in table 6 was added to the blank paint formulation provided in table 3 which was treated as a reference and compared with the tinted paint formulation prepared according to table 4. The % reduction in viscosity loss at a shear rate of 1 sec$^{-1}$ and 100 sec$^{-1}$ for blank (no colorant/pigment paste) paint formulation and that of tinted paint formulation (with colorant/pigment paste) were studied. Viscosity loss values for blank paint formulation and tinted paint formulation both at a shear rate of 1 sec$^{-1}$ and at 100 sec$^{-1}$ were considered to arrive at a conclusion regarding reduction in viscosity loss upon tinting. The results are provided in table 7 and 8, respectively.

Table 7 provides the % viscosity loss on tinting at a shear rate of 1 sec$^{-1}$ for blank paint formulation and tinted paint formulation.

TABLE 7

| Example | Viscosity at shear rate of 1 sec$^{-1}$ for blank paint formulation (in Pa · s) | Viscosity at shear rate of 1 sec$^{-1}$ for tinted paint formulation (in Pa · s) | % Viscosity loss on tinting at 1 sec$^{-1}$ (in %) |
|---|---|---|---|
| example 6* | 16.830 | 14.540 | 14 |
| example 7* | 5.249 | 1.619 | 69 |
| example 8 | 42.500 | 15.650 | 63 |
| example 9 | 15.180 | 14.930 | 2 |
| example 10* | in-homogenous paint formulation-composition (additive) not applicable | | |

*not within the scope of the invention

In the comparative example 6*, wherein the composition (additive) comprised of a polyurethane polymer based upon stearyl alcohol (linear, C18), the composition was found to be turbid and phase separation occurred after storage. Thus, composition of the comparative example 6* being unstable is not suitable for addition to paint formulations. Further, in the comparative example 7*, wherein the composition (additive) comprised of a polyurethane polymer based upon 2-butyl octanol (branched, C12), the % viscosity loss on tinting at a shear rate of 1 s$^{-1}$ when compared with blank paint formulation was found to be 69%, which means that when colorant/pigment paste is added to the paint formulation comprising the composition (additive) of example 7* the viscosity loss was found to be 69% compared with blank paint formulation, which is a substantial decrease in viscosity compared with the blank paint formulation. Further, in the comparative example 10*, wherein the composition (additive) comprised of a polyurethane polymer based upon 2-decyl-1-tetradecanol (branched, C24), the composition when added to the paint formulation resulted in an in-homogenous paint formulation.

However, in the inventive example 8, wherein the composition (additive) according to the present invention was comprised of a polyurethane polymer based upon Eutanol® G16 (branched, C16), the % viscosity loss on tinting at a shear rate of 1 s$^{-1}$ when compared with blank paint formulation was found to be 63% which is less that example 7*, i.e. 69% viscosity loss on addition of pigment to paint formulation. Further, in the inventive example 9, wherein the composition (additive) comprised of a polyurethane polymer based upon Eutanol® G (branched, C20), the % viscosity loss on tinting at a shear rate of 1 s$^{-1}$ when compared with blank paint formulation was found to be 2%. Thus, the inventive examples demonstrate that when composition (additive) of the present invention is added to the paint formulations, the viscosity loss when colorant/pigment paste is added to said paint formulations is reduced to a significant extent thereby maintaining the viscosity of the paint formulation to desired level, depending upon the intended application, even after addition of pigment to the paint formulation.

Further, table 8 provides the % viscosity loss on tinting at a shear rate of 100 sec$^{-1}$ for blank paint formulation and tinted paint formulation.

TABLE 8

| Example | Viscosity at shear rate of 100 sec$^{-1}$ for blank paint formulation (in Pa · s) | Viscosity at shear rate of 100 sec$^{-1}$ for tinted paint formulation (in Pa · s) | % Viscosity loss on tinting at 100 sec$^{-1}$ (in %) |
|---|---|---|---|
| example 6* | 0.582 | 0.307 | 48 |
| example 7* | 1.339 | 0.771 | 43 |
| example 8 | 1.099 | 0.769 | 30 |
| example 9 | 0.455 | 0.333 | 26 |
| example 10* | in-homogenous paint formulation-composition (additive) not applicable | | |

*not within the scope of the invention

In the comparative example 6*, wherein the composition (additive) comprised of a polyurethane polymer based upon stearyl alcohol (linear, C18), the composition was found to be turbid and phase separation occurred after storage. Thus, composition of the comparative example 6* being unstable is not suitable for preparing paint formulations. In comparative example 7*, wherein the composition (additive) comprised a polyurethane polymer based upon 2-butyl octanol (branched, C12), the % viscosity loss on tinting at a shear rate of 100 s$^{-1}$ when compared with blank paint formulation was found to be 43%, which means that when colorant/pigment paste was added to the blank paint formulation comprising the composition (additive), the viscosity loss was found to be 43% compared with blank paint formulation, which is a substantial decrease in viscosity compared with the blank paint formulation. Further, in the comparative example 10*, wherein the composition (additive) comprised of a polyurethane polymer based upon 2-decyl-1-tetradecanol (branched, C24), the composition when added to the paint formulation resulted in an in-homogenous paint formulation.

However, in the inventive example 8, wherein the composition (additive) comprised of a polyurethane polymer based upon Eutanol® G16 (branched, C16), the % viscosity loss on tinting at a shear rate of 100 s$^{-1}$ when compared with blank paint formulation was found to be 30% which is less that of example 7*, i.e. 43% viscosity loss on addition of pigment to paint formulation. Further, in the inventive example 9, wherein the composition (additive) comprised of a polyurethane polymer based upon Eutanol® G (branched, C20), the % viscosity loss on tinting at a shear rate of 100 s$^{-1}$ when compared with blank paint formulation was found to be 26% which means that the loss of viscosity upon tinting the blank paint formulation was found to be 26% when compared to that of blank paint formulation. Thus, the inventive examples 8 and 9 demonstrate that when composition (additive) of the present invention is added to the paint formulations, the viscosity loss when pigment is added to said paint formulations is reduced to a significant extent thereby maintaining the viscosity of the paint formulation to desired level, depending upon the intended application, even after addition of pigment to the paint formulation.

As is clearly evident, compositions (additives) comprising polyurethane polymers based on larger Guerbet alcohols (alkyl having 13 to 23 carbon atoms), for example Eutanol® G16 (C16) and Eutanol® G (C20) give clear liquid formulations which are stable upon storage, easy to incorporate into the paint formulation and improve viscosity loss on tinting, i.e. the viscosity loss when the pigment is added to the blank paint formulation is less. However, when composition (additive) comprising polyurethane polymer based upon Guerbet alcohol greater than 23 carbon atoms for example—2-decyl-tetradecanol (C24), was used in the paint formulations as an additive, it resulted in an in-homogenous paint sample.

II) Impact of Diluent on Stability of the Composition (Additive) and on Viscosity Loss on Tinting i) Compositions (additives) prepared using the polyurethane polymer (based on alcohol Eutanol® G, branched; C20) of example 4.

A diluent is required to obtain an aqueous composition (additive) according the present invention. In order to meet market requirements, the final product form has to be free of volatile organic compounds (VOC). Choosing the right diluent ensures a stable composition (additive) upon storage and reduces the viscosity of the composition resulting in a pourable liquid (preferably, neat viscosity from 0.1 Pa·s to 10 Pa·s, more preferably 0.1 to 8 Pa·s).

The inventors surprising found that the composition (additive) comprising a diluent based on alkoxylated (i.e. ethoxylated, propoxylated) alcohols having alkyl from 7 to 11 carbon atoms and having at least 5 alkoxy groups are suitable for use as an additive for paint formulations and shows less viscosity loss on tinting when composition (additive) comprising diluent as described above is used in paint formulations as additives.

In order to demonstrate the impact of diluent on stability of the composition (additive) according to the present invention, and effect on viscosity loss on tinting in paint formulations, experiments were conducted by the inventors, the results of which are provided hereinbelow. Viscosity loss values for blank paint formulation and tinted paint formulation both at a shear rate of 1 sec$^{-1}$ and at 100 sec$^{-1}$ were considered to arrive at a conclusion regarding reduction in viscosity loss upon tinting.

In comparative examples 11* to 16*, the composition which were used as an additive in the paint formulations was prepared using the polyurethane polymer (based on alcohol Eutanol® G, branched C20) of example 4 and the effect of the diluent—butyl diglycol (alkyl: C4; EO 2) and Dehydol® O4 deo (alkyl: C8; EO 4) were studied. The compositions were prepared according to the method provided at page 30 by mixing the compounds mentioned in table 9.

TABLE 9

| Example | Polyurethane polymer example 4 (in wt.-%) | Diluent example | diluent (in wt.-%) | Water (in wt.-%) | Properties composition (product) form | appearance | neat viscosity (in Pa · s) | storage stability |
|---|---|---|---|---|---|---|---|---|
| 11* | 25 | butyl diglycol (alkyl: C4; EO 2) | 10 | 65 | gel | turbid | — | unstable |
| 12* | 25 | butyl diglycol (alkyl: C4; EO 2) | 15 | 60 | liquid | turbid | 1.700 | unstable |
| 13* | 25 | butyl diglycol (alkyl: C4; EO 2) | 20 | 55 | liquid | turbid | 1.100 | unstable |
| 14* | 25 | Dehydol 04 deo (alkyl: C8; EO 4) | 10 | 65 | liquid | turbid | 22.000 | unstable |
| 15* | 25 | Dehydol ® 04 deo (alkyl: C8; EO 4) | 15 | 60 | liquid | turbid | 3.000 | unstable |
| 16* | 25 | Dehydol ® 04 deo (alkyl: C8; EO 4) | 20 | 55 | liquid | turbid | 1.700 | unstable |

*not within the scope of the invention

As is evident from comparative examples 11* to 16*, the compositions (additives) prepared using diluent having alkoxylated (ie. ethoxylated) alcohols with alkyl having less than 7 carbon atoms, for example butyl diglycol (alkyl C4) and having alkoxy groups less than 5, i.e EO2, were found to be turbid and unstable. Also, when diluent Dehydol® O4 deo (alkyl: C8 and EO4) is added to the composition (additives) the compositions were found to be turbid and unstable.

Further, in the comparative examples 17* to 19* as provided in table 10, the composition which is used as an additive in the paint formulations was prepared using the polyurethane polymer (based on alcohol Eutanol G, branched C20) of example 4 and the effects of the diluent Lutensol® ON 30 (alkyl: C10; EO 3) were studied.

The composition of inventive examples 20 and 21 as provided in table 10 were prepared using the polyurethane polymer (based on alcohol Eutanol G, branched C20) of example 4 and the effects of the diluent Lutensol® ON 60 (alkyl: C10; EO 6) were studied.

The compositions were prepared by mixing the compounds mentioned in table 10.

As is clearly evident, the compositions (additives) of comparative examples 17* to 19* prepared using diluent having ethoxylated alcohols, i.e. Lutensol® ON 30 (alkyl: C10; EO 3) with alkyl having more than 7 carbon atoms but having alkoxy units less than 5, i.e. EO 3, were found to form gel and were unstable. Whereas, the compositions (additives) of inventive examples 19 and 20 prepared using diluent having alkoxylated alcohols, i.e. Lutensol® ON 60 (alkyl: C10; EO 6) with alkyl having more than 7 carbon atoms and also having alkoxy units more than 5, i.e. EO 6, were found to be clear and stable.

Viscosity loss on tinting was studied for the inventive examples 20 and 21. The results of the studies are provided in table 11.

TABLE 10

| Example | Polyurethane polymer example 4 (in wt.-%) | Diluent example | diluent (in wt.-%) | Water (in wt.-%) | Properties composition (product) form | appearance | neat viscosity (in Pa · s) | storage stability |
|---|---|---|---|---|---|---|---|---|
| 17* | 25 | Lutensol ® ON 30 (alkyl: C10; EO 3) | 10 | 65 | gel | — | — | unstable |
| 18* | 25 | Lutensol ® ON 30 (alkyl: C10; EO 3) | 15 | 60 | gel | — | — | unstable |
| 19* | 25 | Lutensol ® ON 30 (alkyl: C10; EO 3) | 20 | 55 | gel | — | — | unstable |
| 20 | 25 | Lutensol ® ON 60 (alkyl: C10; EO 6) | 15 | 60 | liquid | clear | 8.000 | stable |
| 21 | 25 | Lutensol ® ON 60 (alkyl: C10; EO 6) | 20 | 55 | liquid | clear | 6.000 | stable |

*not within the scope of the invention

TABLE 11

| Example | Viscosity at shear rate of 1 sec$^{-1}$ for blank paint formulation (in Pa · s) | Viscosity at shear rate of 1 sec$^{-1}$ for tinted paint formulation (in Pa · s) | % Viscosity loss on tinting at 1 sec$^{-1}$ (in %) | Viscosity at shear rate of 100 sec$^{-1}$ for blank paint formulation (in Pa · s) | Viscosity at shear rate of 100 sec$^{-1}$ for tinted paint formulation (in Pa · s) | % Viscosity loss on tinting at 100 sec$^{-1}$ (in %) |
|---|---|---|---|---|---|---|
| example 20 | 15.180 | 14.930 | 2 | 0.455 | 0.333 | 26 |
| example 21 | 15.120 | 15.120 | 0 | 0.682 | 0.432 | 36 |

In the inventive examples 20 and 21, wherein the composition (additive) comprised of a diluent having alkoxylated alcohol, i.e. Lutensol® ON 60 (alkyl: C10; EO 6) with alkyl having more than 7 carbon atoms and also having alkoxy units more than 5, i.e. EO 6, the % viscosity loss on tinting at a shear rate of 1 sec$^{-1}$ when compared with blank paint formulation was found to be 2% and 0%, respectively. Further, the % viscosity loss on tinting at a shear rate of 100 sec$^{-1}$ for examples 20 and 21 was found to be 26% and 36%, respectively. Thus, the inventive examples 20 and 21 demonstrate that when composition (additive) according to the present invention is added to the paint formulations, the viscosity loss when pigment is added to said paint formulations is reduced to a significant extent thereby maintaining the viscosity of the paint formulation to desired level even after addition of pigment to the paint formulation.

In order to further demonstrate that the composition (additive) according to the present invention requires that the diluent is based on alkoxylated (ie. ethoxylated, propoxylated) alcohols having alkyl from 7 to 11 carbon atoms and having at least 5 alkoxy groups, the inventors tested the effect of compositions prepared using the polyurethane polymer (based on alcohol Eutanol G, branched C20) of example 4 and diluents Dehydol® LS 6 (alkyl: C12-C14; EO 6), Dehydol® LT 6 (alkyl: C12-C18; EO 6), Dehydol® LT 8 (alkyl: C12-C18; EO 8), Dehydol® TO 5 (alkyl: C13; EO 5), Dehydol® TO 6 (alkyl: C13; EO 6), and Dehydol® TO 8 (alkyl: C13; EO 8) on paint formulations. The effects of the aforementioned diluents on the stability of the composition have been provided for comparative examples 22* to 27* in table 12.

TABLE 12

| | Polyurethane polymer | Diluent | | | composition | Properties | | |
|---|---|---|---|---|---|---|---|---|
| Example | example 4 (in wt.-%) | example | diluent (in wt.-%) | Water (in wt.-%) | (product) form | appearance | neat viscosity (in Pa · s) | storage stability |
| 22* | 25 | Dehydol® LS 6 (alkyl: C12-C14; EO 6) | 20 | 55 | Gel | — | — | unstable |
| 23* | 25 | Dehydol® LT 6 (alkyl: C12-C18; EO 6) | 20 | 55 | Gel | — | — | additives (thickeners) not applicable |
| 24* | 25 | Dehydol® LT 8 (alkyl: C12-C18; EO 8) | 20 | 55 | Gel | — | — | additives (thickeners) not applicable |
| 25* | 25 | Dehydol® TO 5 (alkyl: C13; EO 5) | 20 | 55 | Gel | — | — | additives (thickeners) not applicable |
| 26* | 25 | Dehydol® TO 6 (alkyl: C13; EO 6) | 20 | 55 | Gel | — | — | additives (thickeners) not applicable |
| 27* | 25 | Dehydol® TO 8 (alkyl: C13; EO 8) | 20 | 55 | Gel | — | — | additives (thickeners) not applicable |

*not within the scope of the invention

As is clearly evident, the compositions (additives), i.e. comparative examples 22* to 27* prepared using diluent having alkoxylated (i.e. ethoxylated) alcohols with alkyl having more than 11 carbon atoms were found to form gel and were unstable and hence not applicable as additives (thickeners) for paint formulations.

ii) Compositions (additives) prepared using the polyurethane polymer (based on alcohol Eutanol® G 16, branched; C16) of example 3.

In order to further demonstrate that the composition (additive) according to the present invention requires that the diluent is based on alkoxylated alcohols having alkyl from 7 to 11 carbon atoms and having at least 5 alkoxy groups, the inventor prepared compositions (additives) using polyurethane polymer based on alcohol Eutanol® G 16, branched; C16) of example 3. The compositions were prepared using compounds provided in table 13.

TABLE 13

| Example | Polyurethane polymer example 3 (in wt.-%) | Diluent example | diluent (in wt.-%) | Water (in wt.-%) | composition (product) form | appearance | neat viscosity (in Pa · s) | storage stability |
|---|---|---|---|---|---|---|---|---|
| 28* | 25 | butyl diglycol (alkyl: C4; EO 2) | 20 | 55 | liquid | turbid | 0.700 | unstable |
| 29* | 25 | Dehydol ® O4 deo (alkyl: C8; EO 4) | 20 | 55 | gel | — | 1.630 | unstable |
| 30* | 25 | Lutensol ® ON 30 (alkyl: C10; EO 3) | 20 | 55 | gel | — | — | additive (thickener) not applicable |
| 31 | 25 | Lutensol ® ON 60 (alkyl: C10; EO 6) | 15 | 60 | liquid | clear | 6.498 | stable |
| 32 | 25 | Lutensol ® ON 60 (alkyl: C10; EO 6) | 20 | 55 | liquid | clear | 3.119 | stable |
| 33* | 25 | Dehydol ® LS 6 (alkyl: C12-C14; EO 6) | 20 | 55 | gel | — | — | additive (thickener) not applicable |
| 34* | 25 | Dehydol ® LT 6 (alkyl: C12-C18; EO 6) | 20 | 55 | gel | — | — | additive (thickener) not applicable |
| 35* | 25 | Dehydol ® LT 8 (alkyl: C12-C18; EO 8) | 20 | 55 | liquid | — | — | unstable (additive (thickener) not applicable) |
| 36* | 25 | Dehydol ® TO 5 (alkyl: C13; EO 5) | 20 | 55 | gel | — | — | unstable (additive (thickener) not applicable) |
| 37* | 25 | Dehydol ® TO 6 (alkyl: C13; EO 6) | 20 | 55 | gel | — | — | unstable (additive (thickener) not applicable) |
| 38* | 25 | Dehydol ® TO 8 (alkyl: C13; EO 8) | 20 | 55 | gel | — | — | unstable (additive (thickener) not applicable) |

*not within the scope of the invention

As is clearly evident from the results provided in table 13, the composition (additive) comprising a diluent based on alkoxylated (i.e. ethoxylated) alcohols having alkyl from 7 to 11 carbon atoms and having at least 5 alkoxy units are stable and suitable for use as an additive for paint formulations. In comparative examples 28* to 30* and 33* to 38* compositions (additives) comprise diluents, i.e. alkoxylated alcohols either having alkyl with carbon atoms outside the range of 7 to 11 and/or having less than 5 alkoxy groups were found to be unstable and not useful as additives (thickeners). The composition comprising diluents based on alkoxylated alcohol having alkyl groups with less than 7 carbon atoms, for example, butyl diglycol, Dehydol® O4 were found to be unstable. Also, compositions comprising alkoxylated alcohols with lower than 5 alkoxy groups, for example, Lutensol® ON 30 were found to be unstable. Further, compositions comprising alkoxylated alcohols having alkyl with more than 11 carbon atoms, for example, Dehydol® LT 8, Dehydol® TO 5, Dehydol® TO 6 and Dehydol® TO 8 were unstable. Whereas, the compositions (additives) provided in the inventive examples 31 and 32 comprising a diluent Lutensol® ON 60 (alkyl: C10; EO 6) was found to be a clear liquid which was stable.

Further, the inventor studied the viscosity loss on tinting at a shear rate of 100 $s^{-1}$ for the inventive examples 31 and 32. The results have been provided in table 14.

TABLE 14

| Example | Viscosity at shear rate of 100 $sec^{-1}$ for blank paint formulation (in Pa · s) | Viscosity at shear rate of 100 $sec^{-1}$ for tinted paint formulation (in Pa · s) | % Viscosity loss on tinting at 100 $sec^{-1}$ (in %) |
|---|---|---|---|
| example 31 | 1.056 | 8.84 | 16 |
| example 32 | 1.155 | 1.004 | 13 |

The composition (additive) comprised of a diluent having alkoxylated alcohols, i.e. Lutensol® ON 60 (alkyl: C 10; EO 6) with alkyl having more than 7 carbon atoms and also having alkoxy units more than 5, i.e. EO 6, the % viscosity loss on tinting at a shear rate of 100 $sec^{-1}$ was found to be 16% and 13%, respectively. Thus, the inventive examples 31 and 32 demonstrate that when composition (additive) of the present invention is added to the paint formulations the viscosity loss when pigment is added to said paint formulations is reduced to a significant extent thereby maintaining the viscosity of the paint formulation to desired level, depending upon the intended application, even after addition of pigment to the paint formulation.

The invention claimed is:
1. A composition, comprising:
(A) ≥10 wt.-% to ≤50 wt.-%, based on a total weight of the composition, of at least one polyurethane polymer obtainable by reacting:

(a) at least one polyol selected from the group consisting of a polyalkylene glycol and a polyvinyl alcohol,
(b) at least one aliphatic alcohol selected from the group consisting of 2-hexyl decanol and 2-octyl dodecanol, and
(c) at least one difunctional isocyanate, (B) ≥12 wt.-% to ≤25 wt.-%, based on the total weight of the composition, of at least one diluent of formula (II), $$R^3\text{—}(OR^4)_x(OR^5)_y\text{—}OH \qquad (II)$$

wherein $R^3$ is linear or branched, unsubstituted alkyl having 10 carbon atoms,
$R^4$ is an ethylene group,
$R^5$ is a propylene group,
x is 6, and y is 0, and (C) ≥30 wt.-% to ≤75 wt.-%, based on the total weight of the composition, of water.

2. The composition according to claim 1, wherein the at least one polyol (a) is a polyalkylene glycol of formula (III), $$H\text{—}(OR^6)_m\text{—}OH \qquad (III)$$

wherein $R^6$ is $C_2$-$C_4$-alkylene and
m is an integer in a range of ≥15 to ≤500.

3. The composition according to claim 2, wherein, in the polyalkylene glycol of formula (III), $R^6$ is ethylene and m is in a range of ≥50 to ≤500.

4. The composition according to claim 1, wherein, in the at least one polyol (a), a weight average molecular weight $M_w$ of the polyalkylene glycol is in a range of ≥3000 g/mol to ≤20000 g/mol determined according to DIN 55672-1.

5. The composition according to claim 1, wherein, in the at least one polyurethane polymer (A), the at least one polyol (a) is present in an amount in range of ≥50 wt.-% to ≤90 wt.-%, based on a total weight of the polyurethane polymer (A).

6. The composition according to claim 1, wherein, in the at least one polyurethane polymer (A), the at least one aliphatic alcohol (b) is present in an amount in a range of ≥5 wt.-% to ≤20 wt.-%, based on a total weight of the polyurethane polymer (A).

7. The composition according to claim 1, wherein, in the at least one polyurethane polymer (A), the at least one difunctional polyisocyanate (c) is selected from the group consisting of 1,5-naphthalene diisocyanate, 4,4-diphenylmethane diisocyanate (MDI), hydrogenated MDI ($H_{12}$MDI), xylylene diisocyanate (XDI), tetramethylxylene diisocyanate (TMXDI), 4,4-diphenyldimethylmethane diisocyanate, di- and tetraalkyldiphenylmethane diisocyanate, 4,4-dibenzyl diisocyanate, 1,3-phenylene diisocyanate, 1,4-phenylene diisocyanate, the isomers of tolylene diisocyanate (TDI), 1-methyl-2,4-diioscyanatocyclohexane, 1,6-diisocyanato-2,2,4-trimethylhexane, 1,6-diisocyanato-2,4,4-trimethylhexane, 4,4-dii socyanatophenylperfluoroethane, tetramethoxybutane 1,4-diisocyanate, butane 1,4-diisocyanate, dicyclohexylmethane diisocyanate, cyclohexane 1,4-diisocyanate, ethylene diisocyanate, bis-isocyanatoethyl phthalate, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanatobutane, 1,2-diisocyanatododecane and isophorone diisocyanate (IPDI).

8. The composition according to claim 1, wherein, in the at least one polyurethane polymer (A), the at least one difunctional isocyanate (c) is present in an amount in a range of ≥5 wt.-% to ≤10 wt.-%, based on a total weight of the polyurethane polymer (A).

9. The composition according to claim 1, wherein, in the at least one polyurethane polymer (A), a weight ratio of the at least one polyol (a), the at least one aliphatic alcohol (b) of formula (I) and the at least one difunctional isocyanate (c) is in a range of 5:0.5:1 to 20:5:1.

10. The composition according to claim 1, wherein an amount of the at least one polyurethane polymer (A) is in a range of ≥10 wt.-% to ≤40 wt.-%, based on the total weight of the composition.

11. The composition according to claim 1, wherein an amount of the at least one diluent (B) is in a range of ≥12 wt.-% to ≤20 wt.-%, based on the total weight of the composition.

12. The composition according to claim 1, wherein an amount of water (C) is in range of ≥40 wt.-% to ≤75 wt.-%, based on the total weight of the composition.

13. The composition according to claim 1, wherein the composition has a viscosity in a range of ≥0.01 Pa·s to ≤100 Pa·s at a temperature of 23° C.±0.2° C., determined according to DIN EN ISO 3219.

14. The composition according to claim 1,
wherein the at least one polyurethane polymer (A) is obtainable by reacting:
≥50 wt.-% to ≤90 wt.-%, based on a total weight of the polyurethane polymer (A), of the at least one polyol (a), wherein the at least one polyol (a) is selected from the group consisting of
a polyalkylene glycol of formula (III), $$H\text{—}(OR^6)_m\text{—}OH \qquad (III)$$

wherein $R^6$ is ethylene and m is an integer in the range of ≥15 to ≤250, and
the polyvinyl alcohol,
≥5 wt.-% to ≤20 wt.-%, based on the total weight of the polyurethane polymer (A), of the at least one aliphatic alcohol (b),
and
≥5 wt.-% to ≤10 wt.-%, based on the total weight of the polyurethane polymer (A), of the at least one difunctional isocyanate (c), wherein the at least one difunctional isocyanate (c) is selected from the group consisting of isophorone diisocyanate (IPDI) and tetramethylxylene diisocyanate (TMXDI).

15. A method of preparing the composition according to claim 1, the method comprising;
i) reacting the at least one polyol (a), the at least one aliphatic alcohol (b), and the at least one difunctional isocyanate (c), to obtain the at least one polyurethane polymer (A)
wherein, before the reacting, the polyalkylene glycol, if present, and the at least one aliphatic alcohol (b) are pre-dried until a water content of each is in a range of ≥0 wt.-% to ≤0.1 wt.-% by weight; and
ii) adding the at least one diluent (B) and the water (C) to the at least one polyurethane polymer (A) obtained in (i), in the presence of at least one catalyst.

16. An aqueous composition, which comprises;
≥0.01 wt. % to ≤10 wt.-%, based on a total weight of the aqueous composition, of the composition according to claim 1; and
≥15 wt.-% to 99.9 wt.-%, based on the total weight of the aqueous composition, of at least one member, selected from the group consisting of a pigment paste, a binder, a filler, a solvent, a defoamer, a neutralising agent, a wetting agent, a pigment dispersing agent, a preservative and water.

17. The aqueous composition according to claim 16, wherein the composition is a paint, lacquer, water-borne coating formulation, architectural coating, industrial coating, varnish, paper coating, wood coating, plastic, tile, adhesive, cosmetic formulation, detergent formulation, textile or drilling muds plaster formulation, plasterboard formulation, hydraulic binder formulation, ceramic formulation or leather formulation.

18. A method for obtaining reduced viscosity loss on tinting, the method comprising adding, to an aqueous composition, the composition according to claim 1.

19. A method of providing thickening properties to an aqueous composition, the method comprising:
  i) preparing the composition according to claim 1 by method comprising
    reacting the at least one polyol (a), the at least one aliphatic alcohol (b) and the at least one difunctional isocyanate (c), to obtain the at least one polyurethane polymer (A),
    wherein, before the reacting, the polyalkylene glycol, if present, and the at least one aliphatic alcohol (b) are pre-dried until a water content of each is in a range of ≥0 wt.-% to ≤0.1 wt.-% by weight; and
    adding the at least one diluent (B) and the water (C) to the at least one polyurethane polymer (A) obtained in (i), in the presence of at least one catalyst; and
  ii) dispersing the composition prepared in i) into an aqueous composition, thereby providing a thickening effect to the aqueous composition,
  wherein the aqueous composition comprises:
    ≥0.01 wt. % to ≤10 wt.-%, based on a total weight of the aqueous composition, of the composition; and
    ≥15 wt.-% to 99.9≤wt.-%, based on the total weight of the aqueous composition, of at least one member selected from the group consisting of a pigment paste, a binder, a filler, a solvent, a defoamer, a neutralising agent, a wetting agent, a pigment dispersing agent, a preservative and water.

20. A paint composition, comprising;
  i) a base paint comprising ≥15 wt.-% to ≤99.9 wt.-%, based on a total weight of the paint composition, of at least one member, selected from the group consisting of a binder, a filler, a solvent, a defoamer, a neutralising agent, a wetting agent, a pigment dispersing agent, a preservative, and water;
  ii) ≥0.1 wt.-% to ≤15 wt.-%, based on the total weight of the paint composition, of a pigment paste; and
  iii) ≥0.01 wt.-% to ≤10 wt.-%, based on the total weight of the paint composition, of the composition according to claim 1.

* * * * *